(12) United States Patent
Shiokawa et al.

(10) Patent No.: US 11,718,013 B2
(45) Date of Patent: Aug. 8, 2023

(54) CONTAINER PRODUCTION METHOD BY LIQUID BLOW MOLDING

(71) Applicant: YOSHINO KOGYOSHO CO., LTD., Tokyo (JP)

(72) Inventors: Mitsuru Shiokawa, Tokyo (JP); Shinichi Tabata, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 0 days.

(21) Appl. No.: 16/309,437

(22) PCT Filed: Apr. 20, 2017

(86) PCT No.: PCT/JP2017/015952
§ 371 (c)(1),
(2) Date: Dec. 12, 2018

(87) PCT Pub. No.: WO2018/003257
PCT Pub. Date: Jan. 4, 2018

(65) Prior Publication Data
US 2019/0283307 A1  Sep. 19, 2019

(30) Foreign Application Priority Data
Jun. 30, 2016  (JP) .................................. 2016-131121

(51) Int. Cl.
*B29C 49/48* (2006.01)
*B29C 49/46* (2006.01)
(Continued)

(52) U.S. Cl.
CPC .............. *B29C 49/48* (2013.01); *B29C 49/42* (2013.01); *B29C 49/42069* (2022.05);
(Continued)

(58) Field of Classification Search
CPC ....... B29C 9/42119; B29C 2049/48825; B29C 49/42069; B29C 2049/4664; B29C 49/46; B29C 49/42119; B65G 47/244
See application file for complete search history.

(56) References Cited

U.S. PATENT DOCUMENTS 2,723,743 A * 11/1955 Carter ....................... B65C 9/06
156/DIG. 27
3,662,048 A * 5/1972 Turner .................... B29C 49/46
264/85
(Continued)

FOREIGN PATENT DOCUMENTS

CN  105121129 A  12/2015
EP  2 930 005 A1  10/2015
(Continued)

OTHER PUBLICATIONS

Translation of World Patent Application Publication No. WO 2016/017059 ("Shiokawa") (Year: 2016).*
(Continued)

*Primary Examiner* — Xiao S Zhao
*Assistant Examiner* — John J DeRusso
(74) *Attorney, Agent, or Firm* — Oliff PLC

(57) ABSTRACT

A container production method by liquid blow molding has a liquid blow molding step of supplying a pressurized liquid into a preform disposed in a metal mold to mold the preform into a container having a trunk that has a flat shape in a plan view and holds the liquid; and a transferring step of taking the container out from the mold and transferring the container in an approximate short axis direction of the trunk.

5 Claims, 4 Drawing Sheets

(51) Int. Cl.
  B29C 49/56 (2006.01)
  B29C 49/42 (2006.01)
  B29L 31/00 (2006.01)
  B29K 23/00 (2006.01)
  B29K 67/00 (2006.01)

(52) U.S. Cl.
  CPC ........ B29C 49/42119 (2022.05); B29C 49/46 (2013.01); B29C 49/56 (2013.01); *B29C 49/48185* (2022.05); *B29C 2049/4664* (2013.01); *B29K 2023/12* (2013.01); *B29K 2067/003* (2013.01); *B29L 2031/7158* (2013.01)

(56) References Cited

U.S. PATENT DOCUMENTS

| | | | | |
|---|---|---|---|---|
| 5,701,726 | A * | 12/1997 | Smith | B65B 35/58 198/419.3 |
| 2013/0193601 | A1 * | 8/2013 | Wilson | B29C 49/4273 264/39 |
| 2014/0083059 | A1 * | 3/2014 | Meinzinger | B65G 29/00 53/484 |
| 2016/0059469 | A1 * | 3/2016 | Diesnis | B65B 7/285 264/524 |
| 2017/0100873 | A1 * | 4/2017 | Tabata | B65B 3/022 |
| 2017/0210052 | A1 * | 7/2017 | Okuyama | B29C 49/46 |
| 2017/0348757 | A1 * | 12/2017 | Kurosawa | B65G 29/00 53/484 |
| 2018/0029280 | A1 * | 2/2018 | Morikami | B29C 49/02 |
| 2018/0281266 | A1 * | 10/2018 | Groh | B29C 49/04 |

FOREIGN PATENT DOCUMENTS

| | | | | |
|---|---|---|---|---|
| JP | S54-056879 | U | 4/1979 | |
| JP | H10-338211 | A | 12/1998 | |
| JP | 2003-175910 | A | 6/2003 | |
| JP | 2012-153423 | A | 8/2012 | |
| JP | 2014-069441 | A | 4/2014 | |
| JP | 2015-104805 | A | 6/2015 | |
| JP | 2016-032921 | A | 3/2016 | |
| JP | 2016-515962 | A | 6/2016 | |
| WO | WO-9408852 | A1 * | 4/1994 | ......... B29C 49/0047 |
| WO | WO-2015079627 | A1 * | 6/2015 | ............ B29C 49/48 |
| WO | WO-2016017059 | A1 * | 2/2016 | ............... B65D 1/02 |
| WO | WO-2016017153 | A1 * | 2/2016 | ......... B29C 49/4205 |

OTHER PUBLICATIONS

Translation of JP 2003-175910 (Year: 2003).*
May 30, 2017 International Search Report issued in International Patent Application No. PCT/JP2017/015952.
Jan. 28, 2020 Office Action issued in Japanese Patent Application No. 2016-131121.
Feb. 3, 2020 Search Report issued in European Patent Application No. 17819624.2.
Apr. 13, 2020 Office Action issued in Chinese Patent Application No. 201780037799.3.
Sep. 3, 2020 Office Action issued in Chinese Patent Application No. 201780037799.3.
Feb. 3, 2021 Office Action issued in Chinese Patent Application No. 201780037799.3.

* cited by examiner

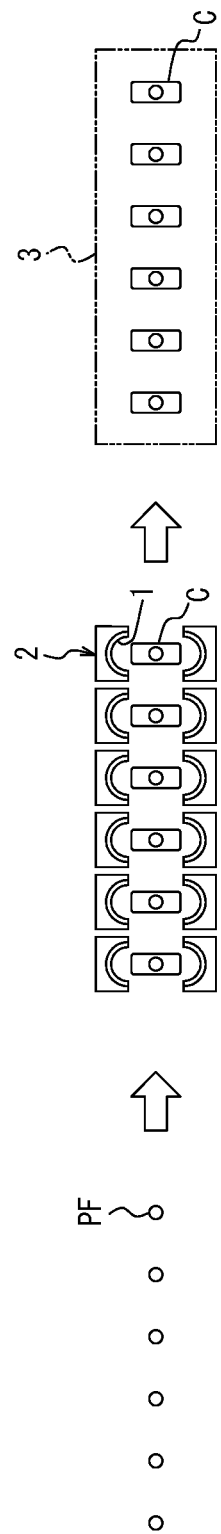

CONTAINER PRODUCTION METHOD BY LIQUID BLOW MOLDING

TECHNICAL FIELD

The present disclosure relates to a container production method by liquid blow molding.

BACKGROUND

Resin containers, typical examples of which are polypropylene (PP) bottles and polyethylene terephthalate (PET) bottles, are used to hold a variety of liquids, such as a beverage, a cosmetic product, a pharmaceutical product, a detergent, and a toiletry including shampoo, as the content liquids. Such a container is generally produced by blow molding a preform that has been formed by a thermoplastic resin material as mentioned above.

As an example of blow molding in which a pressurizing medium is supplied into a preform to mold the preform into a container having a portion of a shape conforming to an inner surface of a cavity of a blow molding mold, liquid blow molding in which a liquid is used as a pressurizing medium is known.

Further, as described in JP 2016-032921 A (PTL 1), for example, a container production method is known in which, during liquid blow molding, as a pressurizing medium, a content liquid to be held in a container is supplied to a preform to produce a container, thus a step of filling a molded container with a content liquid is omitted, and a production process and molding and filling lines can be simplified.

CITATION LIST

Patent Literature

PTL 1: JP 2016-032921 A

SUMMARY

Technical Problem

Here, in the case where a container is produced by such liquid blow molding, when a molded container taken out from a metal mold is transferred to a capping position where a mouth of the container is sealed, liquid inside the container must be prevented from spilling out from the mouth.

In particular, in the case where a container having a trunk of a flat shape in a plan view is produced, liquid is likely to spill out when the container is transferred, and the container must be transferred more slowly than usual, which would inevitably reduce the production speed.

In order to prevent such spilling of liquid, as described in PTL 1, capping before the removal of a container from a metal mold can be considered; however, this would increase the complexity of the production apparatus.

The present disclosure has been conceived in order to solve the problem described above, and it could be helpful to provide a container production method by liquid blow molding, which can improve the speed of production of containers having a flat-shaped trunk.

Solution to Problem

A container production method by liquid blow molding according to this disclosure includes:

a liquid blow molding step of supplying a pressurized liquid into a preform disposed in a metal mold to mold the preform into a container having a trunk that has a flat shape in a plan view and holds the liquid; and a transferring step of taking the container out from the mold and transferring the container in an approximate short axis direction of the trunk.

Further, in the container production method according to this disclosure, in the transferring step, the metal mold is preferably opened in the long axis directions of the trunk.

Still further, in the container production method according to this disclosure, in the transferring step, the metal mold is preferably opened in the short axis directions of the trunk, and the container is transferred after changing the orientation of the container.

Advantageous Effect

The present disclosure provides a container production method by liquid blow molding, which can improve the speed of production of containers having a flat-shaped trunk.

BRIEF DESCRIPTION OF THE DRAWINGS

In the accompanying drawings:

FIG. 1B schematically depicts the steps of the process in FIG. 1A in plan views;

FIGS. 2A and 2B are diagrams schematically depicting the transferring step in FIGS. 1A and 1B, in which FIG. 2A is a plan view and FIG. 2B is a side view; and FIGS. 3A and 3B are diagrams schematically depicting a transferring step in Comparative Example, in which FIG. 3A is a plan view and FIG. 3B is a side view.

DETAILED DESCRIPTION

A container production method by liquid blow molding according to one embodiment of this present disclosure will be described in detail below with reference to the drawings.

Figure 1A:
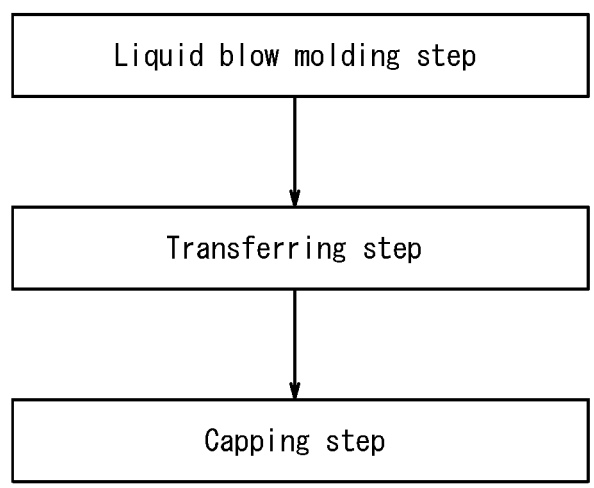
FIG. 1A is a diagram depicting the process of a container production method by liquid blow molding according to one embodiment of the present disclosure.

As illustrated in FIG. 1A, the container production method of this embodiment includes a liquid blow molding step, a transferring step, and a capping step. In this embodiment, as illustrated in FIG. 1B, a plurality of preforms PF are simultaneously transferred using batch metal molds 2 provided with a plurality of (six in the figure) cavities 1 arranged in series, the preforms are molded by liquid blow molding, and the plurality of molded containers C are simultaneously taken out and transferred, and the plurality of containers C are simultaneously capped using a capper 3.

In the liquid blow molding step, first, preforms PF made of resin are disposed in the metal molds 2 for blow molding, which has cavities 1 of a flat shape in a plan view. Here, the cavities 1 can form a flat shape in a plan view over the full length in the vertical direction. The preforms PF can be obtained through injection molding, direct blow molding, extrusion molding, and the like, by using thermoplastic resins such as polypropylene (PP) and polyethylene terephthalate (PET) as materials. The preforms PF each include a bottomed cylindrical trunk and a mouth connecting to the trunk. After the preforms are heated by a heater or the like to a predetermined temperature at which the stretching characteristics are expressed, the trunks of the preforms PF can be placed in the cavities 1 of the metal molds 2.

Figure 2A:
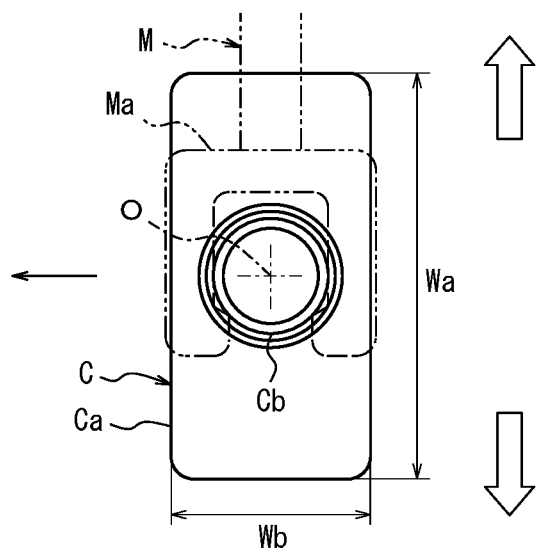

Each metal mold 2 can be configured for example to be opened in the directions indicated by the white arrows in FIG. 2A. Such a metal mold 2 is opened and a preform PF is disposed therein and then is clamped. A nozzle of a blow molding apparatus is connected to the mouth of the preform PF exposed in the metal mold 2, and a pressurized liquid L (see FIG. 2B) is supplied into the preform PF. Thus, the preform PF can be molded into the container C having a trunk Ca that has a flat shape conforming to the inner surface of the cavity 1 and holds the liquid L. Here, a biaxial stretch blow molding using a stretching rod may be performed. Examples of the pressurized liquid L include a beverage, a cosmetic product, a pharmaceutical product, a detergent, and a toiletry including shampoo, which can be a content liquid to be held in the container C.

Figure 2B:
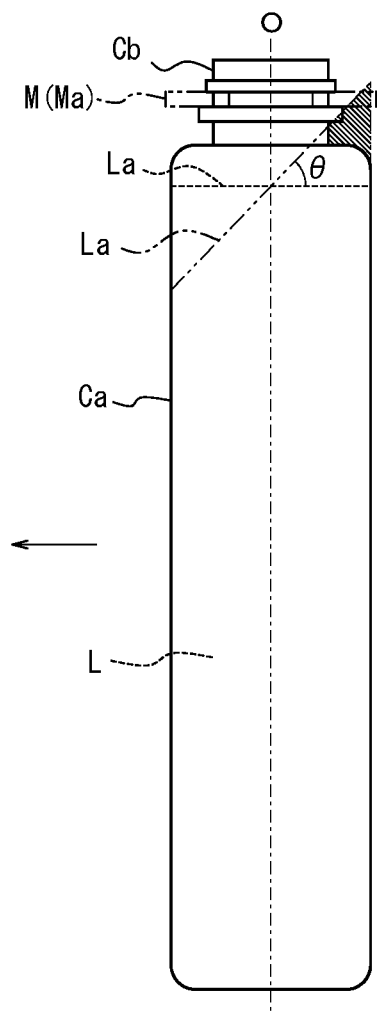

In the transferring step subsequent to the liquid blow molding step, the metal mold 2 is opened again, and the molded container C can be taken out from the metal mold 2 and transferred in a short axis direction of the trunk Ca indicated by the solid arrow in FIGS. 2A and 2B. This transfer can be performed using a transfer apparatus M including a holding member Ma which can hold the mouth Cb of the container C. Note that in the case depicted in the figure, the holding member Ma holds the top of the neck ring of the mouth Cb and a flange formed on the upper side of the neck ring is supported by the holding member Ma. However, the position at which the holding member Ma holds the container C is not limited in particular. In place of the holding member Ma, a catching member may be used which catches the container C only by being hooked on a neck ring or a flange on the neck ring. Further, instead of using the transfer apparatus M, for example, manual transfer may be performed by operators.

As described above, the cavity 1 of the metal mold 2 and the trunk Ca of the container C have a flat shape in a plan view. The phrase "have a flat shape in a plan view" as used herein means that the width Wa (see FIG. 2A) in the long axis direction is larger than the width Wb in the short axis direction perpendicular to the long axis direction in a plan view. Further, transferring the container C in a short axis direction of the trunk Ca instead of a long axis direction thereof in the transferring step make the liquid L hardly spill out from the mouth Cb of the container C, which increases the transfer speed (acceleration).

Figure 3A:
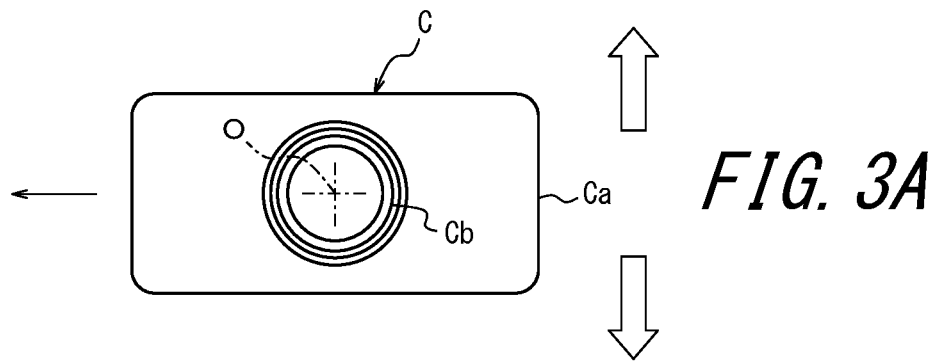

Typically, when the container C having such a flat shape is produced, the directions in which the metal mold 2 is opened is set to the short axis directions as indicated by the white arrows in FIG. 3A in order to make it easier to take out the container C. Accordingly, the container C having been taken out is transferred in a long axis direction as indicated by the solid arrow in FIG. 3A.

Here, the liquid L held in the trunk Ca of the container C is subject to the net force of gravitational force and inertial force. Here, considering a small part of the liquid L on the liquid surface La, when the mass of the small part is taken as m, and the acceleration applied to the container C in the horizontal direction for transfer is taken as a, and the gravitational acceleration is taken as g; the gravitational force acting on the small part is mg, and the inertial force is ma. Accordingly, an angle θ formed between the liquid surface La of the liquid L and a horizontal line is as follows in terms of the geometrical relationship depicted in FIG. 3B.

$$\tan \theta = ma/mg$$

$$\text{Thus, } \theta = \tan^{-1}(a/g)$$

Figure 3B:
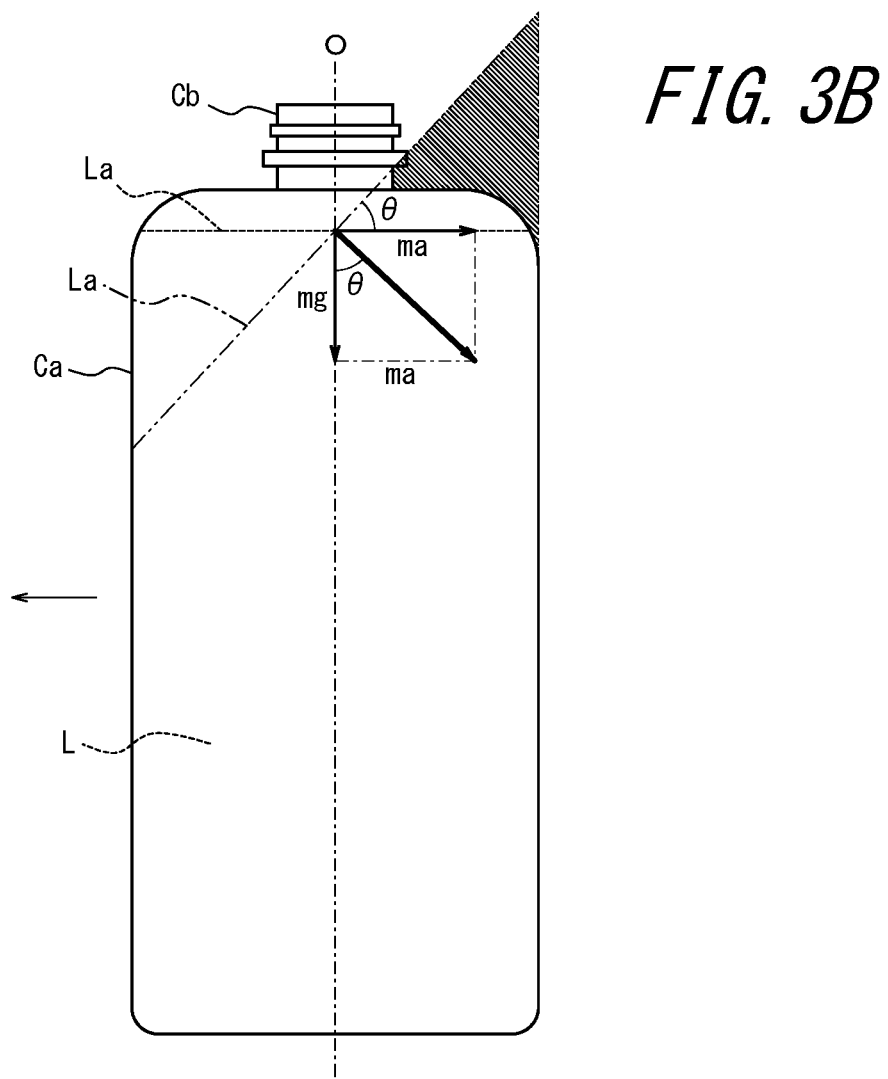

Accordingly, when the container C is transferred for example with an acceleration of 1 G in the horizontal direction, a=g. Therefore, θ=45° as illustrated in FIG. 3B. The liquid L corresponding to the hatched area in the figure migrates toward the mouth Cb. The larger the angle θ (i.e., the acceleration a is higher), the migration is larger and the liquid L would be more likely to spill out from the mouth Cb.

Here, for example, setting the metal mold 2 to be opened in the long axis directions of the trunk Ca as indicated by the white arrows in FIG. 2A, or changing the orientation of the container C after the metal mold 2 is opened in the short axis directions of the trunk Ca to transfer the container in the short axis direction as indicated by the solid arrow in FIG. 2A can reduce the amount of liquid L migrating toward the mouth Cb as indicated by hatching in FIG. 2B. Thus, the container C can be transferred with higher transfer speed (acceleration) without spilling the liquid L, which improves the speed of production of the container C.

The transfer of the container C in the transferring step may be performed while the container C is conveyed in the vertical direction or diagonally up and down. Further, the transfer of the container C in the transferring step is preferably performed such that the container C is transferred in the short axis direction of the trunk Ca over the whole transfer path to a capping position; alternatively, the container C may be transferred in the short axis direction only in part of such a transfer path.

Further, the transfer of the container C in the transferring step is most preferably performed in the short axis direction of the trunk Ca; when the container C is transferred in an approximate short axis direction of the trunk Ca, the above-mentioned effect (that is, an effect to reduce the amount of the liquid L migrating toward the mouth Cb) can be achieved. Here, "transferred in an approximate short axis direction" means that the transfer is performed in a direction inclined at an angle of less than 45° relative to the short axis direction in a plan view. Note that the smaller the angle inclined relative to the short axis direction, the higher is the effect.

In the example illustrated in the figure, the trunk Ca of the container C may have a flat shape along the full length in the vertical direction; at least only an upper portion of the trunk Ca has to have a flat shape. Further, the trunk Ca may have a shape in which the degree of flatness (i.e., the ratio between the width Wa in the long axis direction and the width Wb in the short axis direction) varies in the vertical direction. Further, in the example illustrated in the figure, the trunk Ca has a roughly rectangular top wall which is a horizontal plane with an aperture connecting to the mouth Cb being formed in the center, a pair of roughly rectangular side walls which are vertical planes extending in the long axis direction, a pair of roughly rectangular side walls which are vertical planes extending in the short axis direction, and a bottom wall that is continuous with these walls. The above-mentioned effect is significant when the container C has such a shape; however, even when the container C has a different shape, the same effect can of course be obtained. Specifically, the top wall of the trunk Ca may be inclined relative to a horizontal plane or may form a curved surface, the pair of side walls in the long axis direction and the pair of side walls in the short axis direction may be inclined relative to a vertical plane or may form a curved surface. Alternatively, the outer circumferential surface of the trunk Ca may form an elliptical shape in a plan view. Further, the axial center O of the trunk Ca coincides with the axial center of the mouth Cb; however, even when the axial centers are displaced from each other in the container C, the same effect can be obtained. It is to be noted that the level of the liquid surface La can be set as appropriate considering the relationship between the acceleration a required for the transfer and the shape of the container C.

In the capping step subsequent to the transferring step, the mouth Cb of the container C is sealed for example with a closing cap at the capping position. The sealing with the closing cap may be performed by screwing using a threaded portion or may be performed by engaging using an undercut shape. Further, other than such a closing cap, a mounting cap for the discharge apparatus with pump or a mounting tubular portion for a spout plug may be attached to the mouth Cb of the container C.

As described above, the container production method by liquid blow molding according to this embodiment has a liquid blow molding step of supplying the pressurized liquid L into the preform PF disposed in the metal mold 2 to mold the preform PF into the container C having the trunk Ca that has a flat shape in a plan view and holds the liquid L; and a transferring step of taking the container C out from the metal mold 2 and transferring the container C in an approximate short axis direction of the trunk Ca.

Accordingly, the container production method by liquid blow molding according to this embodiment can increase the transfer speed of the container C having the flat-shaped trunk Ca taken out from the metal mold 2, which improves the speed of production of the container C.

Further, when the transfer of the container C in the short axis direction is performed by opening the metal mold 2 in the long axis directions of the trunk Ca, the container C taken out from the opened metal mold 2 can be transferred in a direction orthogonal to the opening directions, which reduces the time required for the transfer.

Further, when the container C is transferred in the short axis direction after changing the orientation of the container C, the metal mold 2 can be opened in the short axis directions of the trunk Ca, which ensures flexibility for the opening directions.

The above is only an embodiment of this disclosure, and various modifications can be made without departing from the scope of the claims. For example, the metal mold for blow molding may have a vertically slidable bottom mold or may have a slidable mold for molding a desired part. Further, the trunk of the container to be molded may for example have a handle part molded using such a slidable mold.

REFERENCE SIGNS LIST

1 Cavity
2 Metal mold
3 Capper
PF Preform
L Liquid
La Liquid surface
C Container
Ca Trunk
M Transfer apparatus
Ma Holding member
Wa Width in long axis direction
Wb Width in short axis direction
m Mass
a Acceleration in horizontal direction
g Gravitational acceleration
θ Angle
O Axial center

The invention claimed is:

1. A container production method by liquid blow molding, the method comprising:
a liquid blow molding step of (i) supplying a pressurized liquid into a plurality of preforms made of resin disposed in a batch metal mold, the batch metal mold including a plurality of cavities arranged in series, and (ii) molding the plurality of preforms into a plurality of containers each having a trunk with a flat shape in a plan view along a full length in a vertical direction, and each trunk holding the liquid; and
a transferring step of removing the plurality of containers out simultaneously from the batch metal mold and transferring the plurality of containers in a short axis direction of the respective trunks in the plan view in a state in which the plurality of containers are filled with the liquid and a mouth of each container of the plurality of containers is not sealed, an acceleration applied to the plurality of containers in the horizontal direction during transfer of the plurality of containers being more than a gravitational acceleration, the plurality of containers being transferred in the short axis direction in the plan view along an entire length of a transfer path of the plurality of containers from the batch metal mold to a capping location at which the plurality of containers are sealed.

2. The container production method according to claim 1, wherein in the transferring step, the batch metal mold is opened in a long axis direction of the respective trunks.

3. The container production method according to claim 1, wherein in the transferring step, the batch metal mold is opened in the short axis direction, and the plurality of containers are transferred after changing an orientation of the plurality of containers.

4. The container production method according to claim 1, wherein a width Wa in a long axis direction of the trunk is larger than a width Wb in the short axis direction of the trunk perpendicular to the long axis direction in the plan view along the full length in the vertical direction.

5. The container production method according to claim 1, wherein the cavities have a flat shape in the plan view along the full length in the vertical direction.

* * * * *